United States Patent [19]

MacKay et al.

[11] Patent Number: 5,148,154
[45] Date of Patent: Sep. 15, 1992

[54] MULTI-DIMENSIONAL USER INTERFACE

[75] Inventors: Michael T. MacKay, Vallejo; Robert J. Berger, Menlo Park; Robert Duffy, Milpitas; Ted E. Langford, Fremont, all of Calif.

[73] Assignee: Sony Corporation of America, Park Ridge, N.J.

[21] Appl. No.: 622,821

[22] Filed: Dec. 4, 1990

[51] Int. Cl.[5] ............................................. G09G 3/02
[52] U.S. Cl. .................................... 340/712; 340/729; 340/721
[58] Field of Search .............. 340/729, 721, 712, 723; 364/522, 521; 395/154, 159

[56] References Cited

U.S. PATENT DOCUMENTS

| | | | |
|---|---|---|---|
| Re. 32,632 | 3/1988 | Atkinson | 340/709 |
| 4,533,910 | 8/1985 | Sukonick et al. | 340/721 |
| 4,555,775 | 11/1985 | Pike | 364/900 |
| 4,622,545 | 11/1986 | Atkinson | 340/747 |
| 4,697,178 | 9/1987 | Heekel | 364/522 |
| 4,746,994 | 5/1988 | Ettlinger | 360/13 |
| 4,748,618 | 5/1988 | Brown et al. | 370/94 |
| 4,785,408 | 11/1988 | Britton et al. | 364/513 |
| 4,812,834 | 3/1989 | Wells | 340/721 |
| 4,847,604 | 7/1989 | Doyle | 340/706 |
| 4,868,766 | 8/1989 | Oosterholt | 364/522 |
| 4,879,751 | 11/1989 | Franks et al. | 381/119 |
| 4,884,223 | 11/1989 | Ingle et al. | 364/550 |
| 4,899,136 | 2/1990 | Beard et al. | 340/706 |
| 4,914,732 | 4/1990 | Henderson et al. | 340/825 |
| 4,931,783 | 6/1990 | Atkinson | 340/710 |
| 4,935,865 | 6/1990 | Rowe et al. | 364/188 |
| 4,939,507 | 7/1990 | Beard et al. | 340/706 |
| 4,994,989 | 2/1991 | Usami et al. | 340/729 |
| 5,040,131 | 8/1991 | Torres | 364/521 |

OTHER PUBLICATIONS

Alexander, "Visualizing Cleared-Off Desktops" *Computer World*, May 6, 1991, p. 20.
Video Tape "Sony AVTC Venues and View", Oct. 1990.

*Primary Examiner*—Jeffery A. Brier
*Assistant Examiner*—Jick Chin
*Attorney, Agent, or Firm*—Blakely, Sokoloff, Taylor & Zafman

[57] ABSTRACT

The present invention provides apparatus and methods for a multi-dimensional user interface for use in audio visual production. A display system including a central processing unit (CPU) is coupled through appropriate input/output (I/O) circuitry to input devices, such as a keyboard, digital pad and/or track ball as well as a display device. The CPU is further coupled to a hard disk drive for the storage of programs and data, and is also coupled to a network through which the CPU may communicate with a variety of system resource devices such as editors, music synthesizers, graphics generators, scheduling resources, audio enhancement resources, etc. A user viewing the interface on the display may utilize one of the input devices, such as by way of example, the keyboard, to select, incorporate or otherwise integrate the various system resources to develop a unified multi-media production. The user interface of the present invention includes a control frame which in practice substantially fills all of the display screen of the display and is consistent for all user applications. The control frame is comprised of control panels which surround a variety of subwindows and acts as a consistent control area for all users of the interface. Once defined, elements may be selectively placed on an event horizon bar in the control frame. The placement of an element on the event horizon results in the display of timing data for the element, relative to other elements on the event horizon.

56 Claims, 7 Drawing Sheets

MULTI-DIMENSIONAL USER INTERFACE

BACKGROUND OF THE INVENTION

1. Field of the Invention

The present invention relates to apparatus and methods for displaying, manipulating, and selecting multi-media or computer stored information in a window environment of a computer display system. More particularly, the present invention relates to an improved user interface to provide a unified operator interface for a wide range of systems which must be coordinated and monitored in a multi-media production system.

2. Art Background

Videotape editing environments have evolved from providing simple editing cuts to the incorporation of full featured graphics, film to tape and other processes to complete a video production. Consequently, computer controlled editing systems and integration methods have been used to incorporate and integrate various production media resources such as special effects, music, graphics and the like. However, due to the nature of film and video production, a variety of resources must be integrated, scheduled and coordinated with one another to obtain a completed product.

Historically, humans have interfaced with computers through a system of discrete commands which typically comprise a combination of both text and mathematical symbolic characters. Examples of such systems are numerous and include the programming languages of Fortran, Algol, Basic, etc., which transform a given set of user commands into machine executable "object" code. However, the ease with which a user becomes proficient in programming or interacting with a computer-based system is generally a function of how close the system models the logical thought of the user himself. If the user is able to enter commands in the order in which he would find most logically appropriate, rather than having to transpose his desired command into the code of a programming language, greater user efficiency in using the system is achieved.

A number of systems which have been developed to minimize the learning or acclamation period which a user must go through to become proficient in the interaction with the computer system are referred to as "object oriented systems". A common object oriented interface approach utilizes multiple "windows" displayed on a cathode ray tube (CRT) in which combinations of text and graphics are used to convey information. Each window may take the form of an object such as a file folder, different operating environment, pages or layered bit maps to provide a separate display of video information in independent screen regions. (See, for example, Robson, "Object Oriented Software Systems", Byte, August, 1981; and U.S. Pat. Nos. 4,414,628; 4,533,910; 4,450,442; 4,555,775 and 4,622,545, and L. Tesler, "The Small Talk Environment", Byte, August, 1981, Volume 6, No. 8.)

The use of modern computer systems incorporating object oriented window environments may be applied to multi-media production methods, such as videotape editing, audio mixing, etc. However, one unique problem associated with multi-media production is the necessity to provide the ability for a diversity of media professionals to collaborate and exchange project data in a consistent interface environment. By providing a consistent user interface, media professionals such as special effects engineers, animation specialists, music composers, and the like may provide both real time and non-real time input to exchange necessary project data, and effectively coordinate the production of the entire media work. Accordingly, one of the requirements of any common multi-media user interface is the ability to integrate multi-media types, and to provide the operator with the ability to manage large quantities of information in an understandable and efficient manner. The user interface must be intuitive and flexible to accommodate a variety of operator editing styles and personalities. For example, a music composer who thinks typically in terms of scores, notes and related music timing, should be able to work in that environment using a standard user interface, and not be required to work in terms of video time code or other non-music related external standards. Similarly, the film production director or special effects engineer should be able to utilize the user interface in a manner consistent with their work environment, which may, by way of example, be illustrated through the use of video time code signals (and not music).

As will be described, the present invention provides a multi-media user interface which may be utilized by a variety of multi-media professionals in the production of film or tape works. Unlike prior art window based display systems, the present invention provides a three-dimensional representation (known as an "element") of information to be manipulated. Each element comprises a three dimensional representation of a "resource." A resource is a three-dimensional object which may have data represented in either two or three-dimensional form. A window comprises a "venue" which may be configured for specific activities, such as music production, special effects, scheduling and the like. However, the user interface shares common fundamental tools and the same data base, such that each media professional, such as a videotape editor, audio editor, producer, etc. may utilize the interface in a consistent manner.

SUMMARY OF THE INVENTION

The present invention provides apparatus and methods for a multi-dimensional user interface for use in audio visual production. A display system including at least one central processing unit (CPU) is coupled through appropriate input/output (I/O) circuitry to input devices, such as a keyboard, digital pad and/or track ball. The CPU is further coupled to a hard disk drive for the storage of programs and data, and is also coupled to a network through which the CPU may communicate with a variety of system resource devices such as editors, music synthesizers, graphics generators, scheduling resources, audio enhancement resources, etc. The CPU is also coupled to a display device (for example, a CRT) on which the present invention's user interface is displayed to the user. A user viewing the interface on the display may utilize one of the input devices, such as by way of example, the keyboard, to select, incorporate or otherwise integrate the various system resources to develop a unified multi-media production. The user interface of the present invention includes a control frame which in practice substantially fills all of the display screen of the display. The control frame is comprised of control panels which surround a variety of subwindows, and acts as a consistent control area for all users of the interface. The control frame includes a construction area which corresponds typically to a front view port looking toward a three-dimensional element which is a representation of a resource. The control frame further includes a top view port which illustrates the time relationship between the various resources in a "venue". Effectively, the control frame of the present invention provides a two-dimensional window to selectively view a three-dimensional "element". In operation, a user specifies mandatory and optional attributes which an element must have, and defines the element representing the resource within the construction area of the control frame. Once defined, the element may be selectively "dragged" down to an event horizon bar at which time, time data is displayed in the time view port of the control frame. Using the interface of the present invention, elements may be created, edited, bundled, integrated and rearranged along the event horizon.

NOTATION AND NOMENCLATURE

Figure 1:
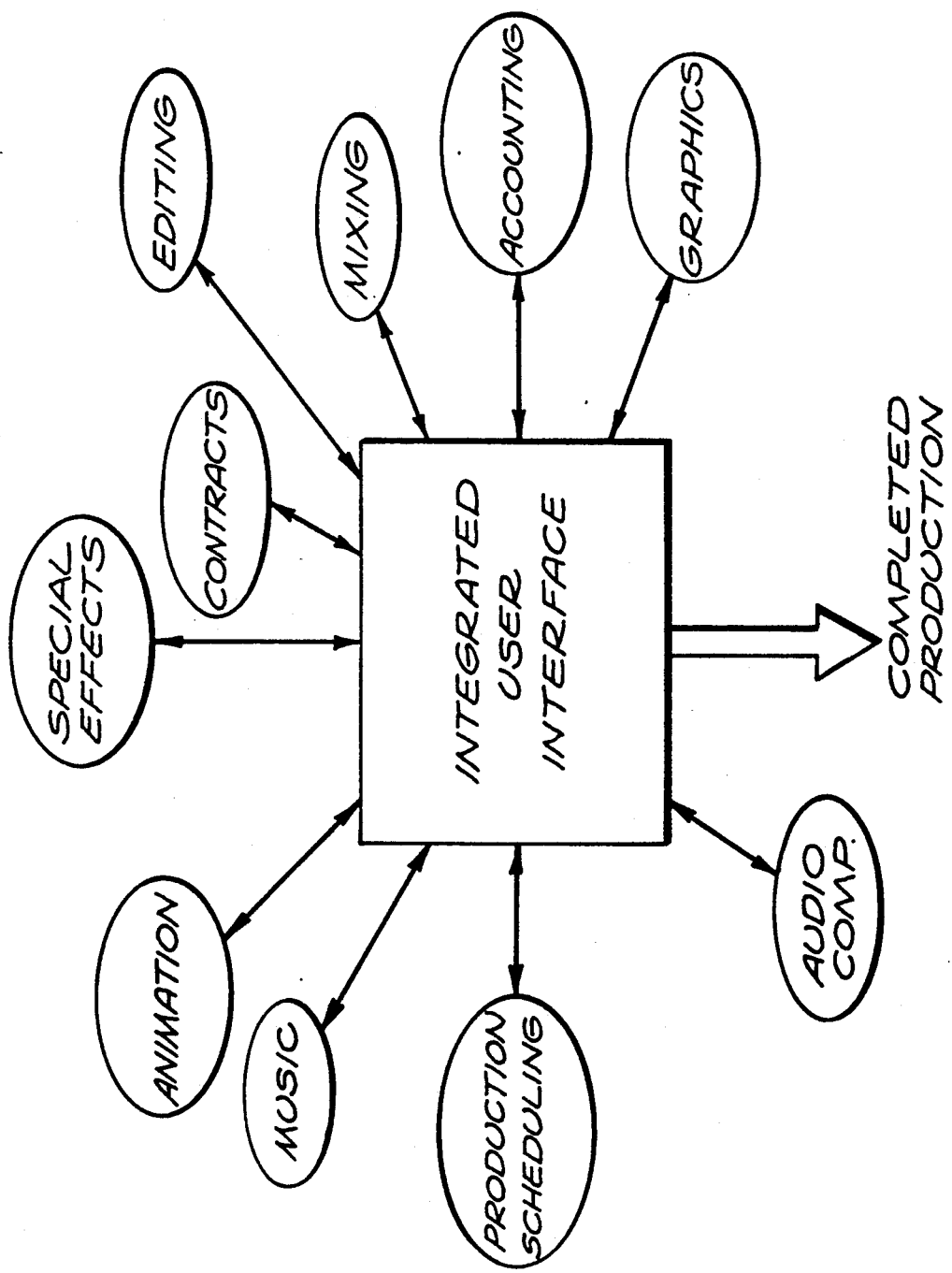
FIG. 1 is a conceptual illustration of the present invention's integrated multi-media user interface for integrating and manipulating a variety of multi-media functions.

The detailed descriptions which follow are presented largely in terms of graphics interfaces, algorithms, and in symbolic representations of operations of data bits within a computer display system. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, icons, characters, terms, numbers, windows or the like. It should be borne in mind, however, that all of these and similar terms are to be associated with the appropriate physical quantities and are merely convenient labels applied to these quantities.

The manipulations performed are often referred to in terms, such as adding or comparing, displaying, etc. which are commonly associated with mental operations performed by human operator. No such capability of a human operator is necessary, or desirable in most cases, in any of the operations described herein which perform part of the present invention. In the present case, the operations are machine operations. Useful machines for performing the operations of the present invention include general purpose digital computers or other similar devices. In all cases, there should be borne in mind the distinction between the method operations of operating a computer and the method of computation itself. The present invention relates to method steps for operating a computer graphics system and processing electrical or other physical signals to generate other desired physical signals.

The present invention also relates to apparatus for performing these operations. This apparatus may be specially constructed for the required purposes, or it may comprise a general purpose computer selectively activated or reconfigured by a computer program stored in the computer. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

DETAILED DESCRIPTION OF THE INVENTION

The following detailed description will be divided into several sections. The first of these will treat a general system arrangement for generating computer graphics in accordance with the teachings of the present invention. Subsequent sections will deal with such aspects of the present invention as the general conceptual definition of a "venue" and "resource", and the structure in operation of the present invention's multi-media user interface.

In addition, in the following description, numerous specific details are set forth such as functional blocks representing data processing devices, window configurations, etc. in order to provide a thorough understanding of the present invention. However, it will be obvious to one skilled in the art that the present invention may be practiced without these specific details. In other instances, well known circuits and structures are not described in detail in order not to obscure the present invention unnecessarily.

GENERAL SYSTEM CONFIGURATION

Referring now to FIG. 1, the present invention is conceptually illustrated. As previously discussed, the present invention provides an integrated user interface, such that media professionals may utilize a common interface and integrate various production processes such as animation, special affects, editing, mixing and production scheduling. Through the use of the present invention's user interface, a variety of resources may be accessed in the production of a feature film, videotape or the like. Unlike prior art systems in which separate special effects production facilities, live action facilities and music score editing facilities are required to work independently, and then be integrated at some later date, the present invention provides a new editing concept to permit an operator to interact with each of the resources comprising a multi-media production and generate a final completed work. As will be described more fully below, the present invention accesses, arranges and coordinates these various production resources through the use of an integrated user interface.

Figure 2:
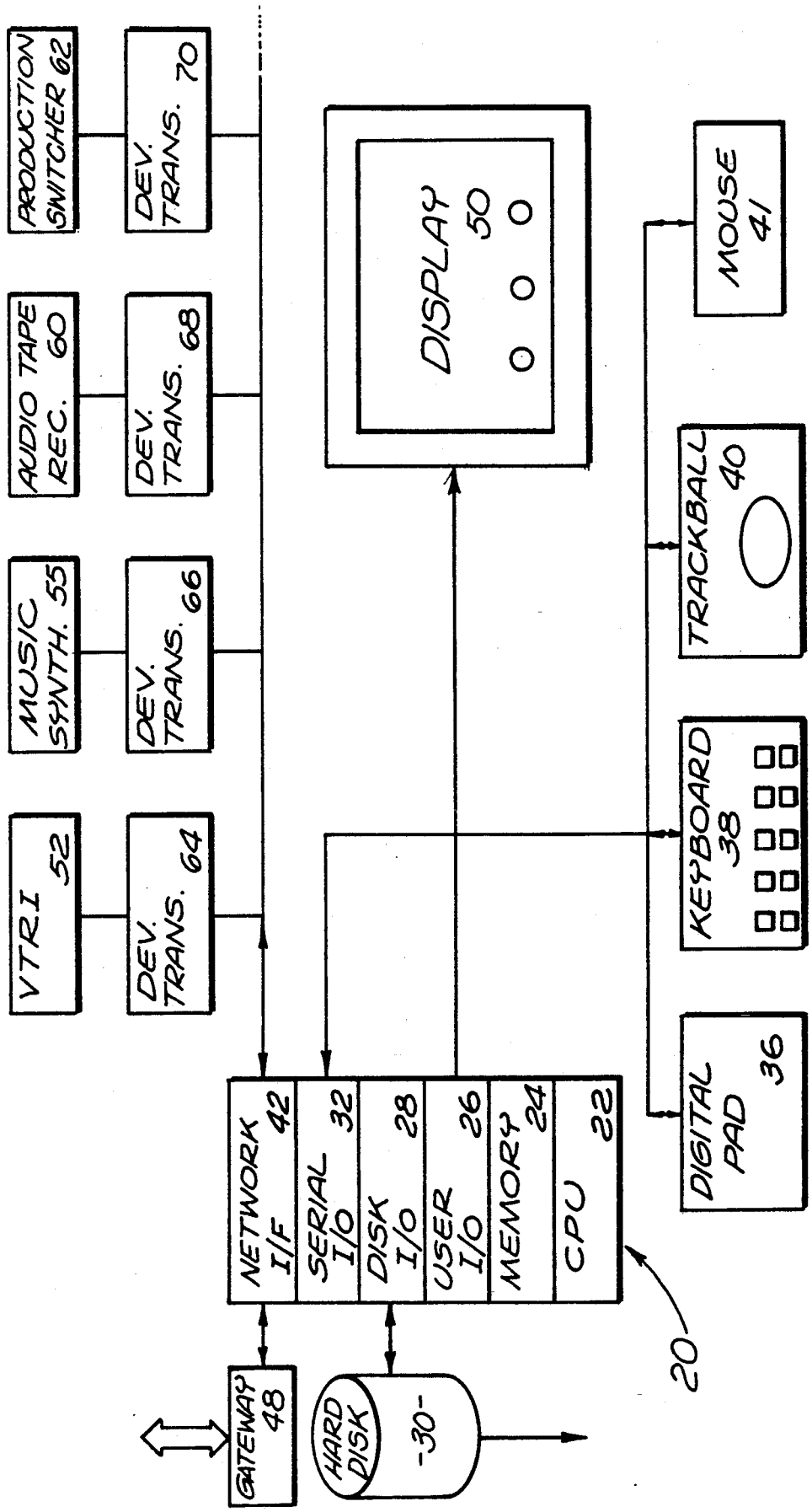
FIG. 2 is a functional block diagram showing one possible data processing system incorporating the teachings of the present invention.

Referring now to FIG. 2, one possible computer graphic system employing the teachings of the present invention is shown. As illustrated, the graphics system includes a computer 20, which comprises six major components. The first of these is a central processing unit (CPU) 22 which is coupled to a memory 24. CPU 22 and memory 24 are further coupled to a user interface circuit 26 and a disk input/output (I/O) circuit 28, for communicating with a hard disk drive 30 for mass storage of data. Computer 20 further includes a serial input/output (I/O) circuit 32 for communicating with serial devices over line 34, such as by way of example a digitizing pad 36, a keyboard 38, and a track ball input device 40. Computer system 20 further includes a network interface circuit 42, which is coupled to a network 44 and a gateway circuit 48, which permits the computer system 20 to communicate with other communication systems over telephone lines, optical fibers and the like.

In addition, a display monitor 50 is illustrated which is used to display the integrated user interface comprising the present invention, and is coupled to the user interface circuit 26. As also illustrated, a variety of resource devices such as a video tape recorder (VTR) 52, music synthesizer 55, audio tape recorder 60 and production switcher 62 are coupled to the network interface circuit 42 over the network 44, through device translators 64, 66, 68 and 70, respectively.

As will be described more fully below, the present invention as illustrated in FIG. 2 permits data from resources such as VTR 52, music synthesizer 55 and audio tape recorder 60 to be coupled to the present invention's user interface. A user viewing the interface on display 50 may utilize one of a variety of input devices, such as by way of example, keyboard 38 or track ball 40 to select, incorporate and otherwise integrate the various system resources to develop a unified multimedia production.

It will be appreciated that the present invention, as illustrated with reference to FIG. 2, is only one possible embodiment of many. For example, although only one computer 20 is shown, the present invention may include multiple CPU's and/or computers coupled to the network 44. Each of these CPU's and/or computers coupled to the network 44 may execute separate programs, and support different versions of the user interface of the present invention. Alternatively, it is contemplated that the use of multiple computers and/or CPU's may support a system of distributed computing, wherein multiple versions of the present invention's user interface may be supported concurrently, each of the multiple user interfaces executing different processes but having access to a common data base of resources. As such, it will be noted that the embodiment shown in FIG. 2 is a simplified embodiment for purposes of illustration, and is not meant to limit the present invention's utility.

RESOURCE ACCESS THROUGH VENUES

Figure 3:
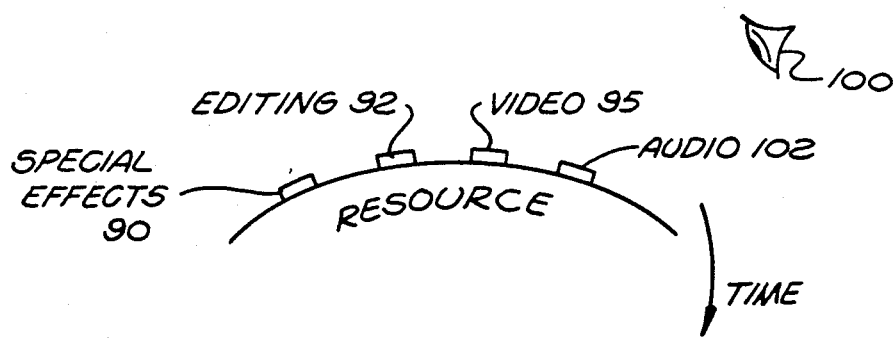
FIG. 3 is a conceptual illustration of the present invention's use of venues to represent data sets of resources available to a user.

Referring now to FIG. 3, the present invention conceptually permits a variety of media resources such as special effects 90, editing sequencer 92 and video resources 95 to be viewed by a user 100 through a "view port", relative in time, along an "event horizon" 104. As will be described, a view port provides a perspective view of data contained in a "venue", wherein a venue may include a plurality of resources such as audio resources 102, video resources 95, etc.

Figure 4:
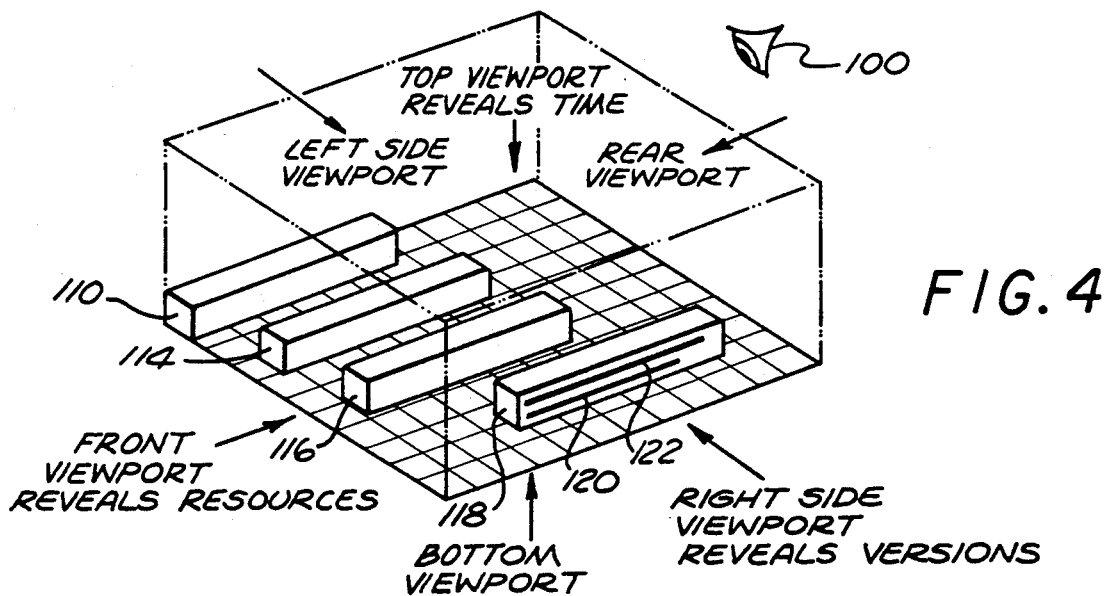
FIG. 4 conceptually illustrates the use of venues and view ports by the interface of the present invention.

Referring now to FIG. 4, the present invention's concept of venues is disclosed in relation to three-dimensional space. The venue concept of the present invention allows the user 100 to view data represented in alternative view ports of a venue. Relationships between a variety of resources are apparently based on the view which the user 100 chooses. As illustrated in FIG. 4, a venue is a three-dimensional space in which object "elements" reside. An "element" is a three dimensional representation of a resource coupled to, for example, the network 44 depicted in FIG. 2. Depending on the view port which is chosen, the elements identify themselves in various ways. For example, in FIG. 4, element 110 may comprise a graphics resource, element 114 may represent an audio resource, element 116 may represent a textual planning resource, and element 118 may represent a music or other audio resource. Viewing a venue through a top view port reveals the relative placement of the various elements in time, both the duration of time that an element represents (such as a film "take") and the relationship between the resources to a reference time, which may be a recording machine, finished film or other multi-media piece. Viewing the right side view port reveals versions of the elements, for example, audio element 118 includes two versions; namely, version 120 and version 122, along with the relative time lengths of the versions. In addition, it should be noted that the user interface of the present invention permits the use of multiple venues, wherein some or all of the venues may share the same time period, and each venue includes its own elements.

For sake of example, assume that the elements illustrated in FIG. 4 represent resources for the production of a soap opera. In this example, assume that a production crew photographed a variety of scenes, transferred these scenes to video tape, and that these scenes comprise scene 1, take 1, etc.

Figure 5:
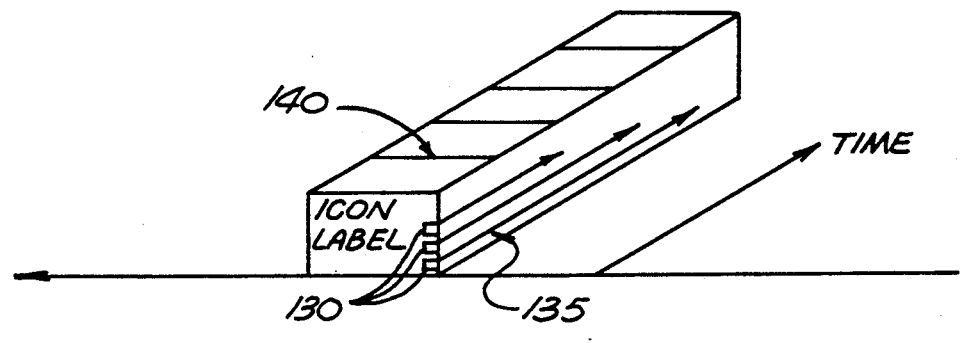
FIG. 5 is a conceptual illustration of an element representing a resource, as viewed in three dimensions utilizing the present invention's user interface.

As shown in FIG. 5, viewing an element through the front view port reveals the type of resource through the use of an icon label. For example, in the case of an audio resource, the icon label may comprise a graphic representation of a musical note. In addition, the various versions are illustrated, as in the case of element 118 in FIG. 4, by darkened lines traversing the longitudinal length of the rectangular element image with respect to FIG. 5, the version may be activated, and thereby run, by placing a cursor on the screen of display 50 over one of the activation buttons 130 on the element, and providing an activation signal, such as for example from a "mouse", to run that particular version of the resource. Returning to the present example of a soap opera production, versions 120 and 122 of the audio element 118 as shown in FIG. 4 and versions 135 of the element 140 as shown in FIG. 5 may comprise musical options for use during the particular time associated by the length of the elements. Similarly, if the resource comprises scenes, then, as is common in the industry, each of these scenes may have associated time codes (such as SMPTE) which comprise the time in and out for each scene. Accordingly, by viewing the element representing the resource in terms of time, the time length of each scene would be represented on the element by the length of the particular version lines, for example lines 135, or alternatively, by duration lines 140 defining the beginning and end time of each scene of the resource.

INTEGRATED USER INTERFACE

Figure 6:
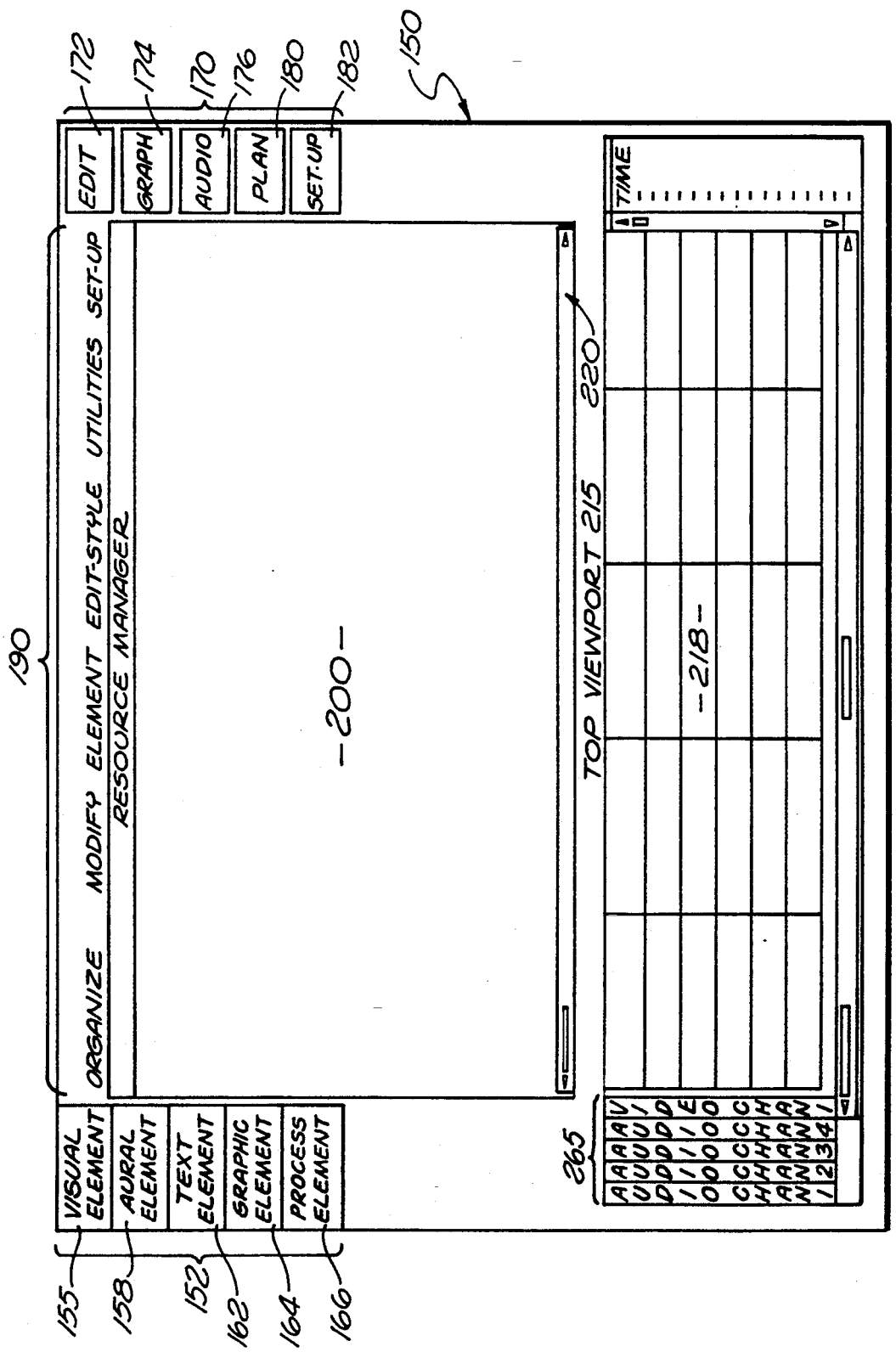
FIG. 6 is a front view of a user display screen utilizing the present invention's multi-media user interface.

Referring now to FIG. 6, the integrated user interface of the present invention will be described. As shown in FIG. 6, the present invention's user interface includes a basic control frame 150 which in practice fills substantially all of the display screen of display 50 as depicted in FIG. 2. The control frame 150 is the primary context for interacting with the user interface of the present invention, and is, primarily, comprised of four control panels which surround a variety of subwindows. Three of the panels are visible to the user at all times, and the bottom panel (not shown) is displayed on an as needed basis. The mode specific action panel 152 comprises, in the displayed embodiment, a plurality of direct action buttons, or icons, which change with the program mode. As shown in the illustration of FIG. 6, the mode specific action panel 152 comprises a visual element 155, an aural element 158, a text element 162, a graphic element 164, and a process element 166. Although buttons 155, 158, 162, 164, and 166 are illustrated in FIG. 6, it will be appreciated that the mode specific action panel buttons/icons change to support and reflect the current activities of the user for a particular venue.

The control frame 150 further includes a major mode panel 170, which comprises an edit button 172, a graphics button 174, an audio button 176, a plan button 180, and a set up button 182. It will be noted that although throughout this description icons, buttons, and the like are described, that the reference to buttons, icons, etc. represents any class of displayed items which result in some executable action when chosen by a user. Therefore, although an edit button 172 is disclosed as part of the control frame 150, it will be appreciated to one skilled in the art that the edit button 172 may comprise an icon in the form of some edit feature or the like which achieves the same result. In the presently preferred embodiment, the buttons comprising the major mode panel 170 are always present for the user no matter which venue or other option is selected.

In general, the major mode panel 170 permits a user to access different venues than the venue currently displayed. The specific buttons/icons used in the major mode panel 170 is a function of the particular project in which the user interface is implemented. A menu bar panel 190 generally displays labels for pull down menus. Standard labels such as "organize", "modify", etc. are provided and are present no matter which venue or resource is accessed. Other context specific menu labels will be displayed such as "element", "edit style", "utilities", "setup", etc. are provided for specific applications.

The application specific construction area 200 comprises an application area of the display for a selected program mode, and is available for subwindows, user views in the display of other elements of work such as time lines, scripts, scores, preview monitors, etc. As shown in FIG. 6, construction area 200 is designated as a resource manager. As will be described, a top view port 215 is also provided in control frame 150. As previously illustrated in FIG. 4, elements representing resources may be viewed and operated upon by appropriately selecting a view point. Although the control frame 150 displays objects in two dimensions, by appropriately selecting the view port, the elements may be viewed from all three dimensions. Elements, utilized in the present invention, directly represent the objects that make up a production, such as scripts, segments of video tape, score, scenes, director notes, sound tracks, etc., and are identified by an icon on the front face of the element as previously described with respect to FIG. 5. Elements can be viewed from the front, side, or from the top, or in multiple views. As previously discussed with reference to the concept of "resources", the front view of the element displays the icon label and the type of element may be determined from the icon on its face (see FIG. 5). Viewing an element from the top view port illustrates the relative length in time the element may have. A view from a side view port illustrates any different versions and their relative lengths. The element/resource may comprise several individual elements, and may be bundled into a new compound element much like current users may group graphical elements using a graphics editor.

Referring once again to FIG. 6, the top view port 215 is used by the present invention to position elements relative to time by placing them on a time line. As will be described in more detail below, placing an element on a bar referred to as the "event horizon" 220 integrates the element into the overall time line for the production and results in the display of time data in the area identified in FIG. 6 as 218. Moving an element from construction region 200 to the event horizon 220 results in the element being assigned a time assignment in the view port 215. It will be noted that the view port 215 corresponds to the top view port view of an element in the three-dimensional representation of resources described with reference to FIG. 4.

Figure 7:
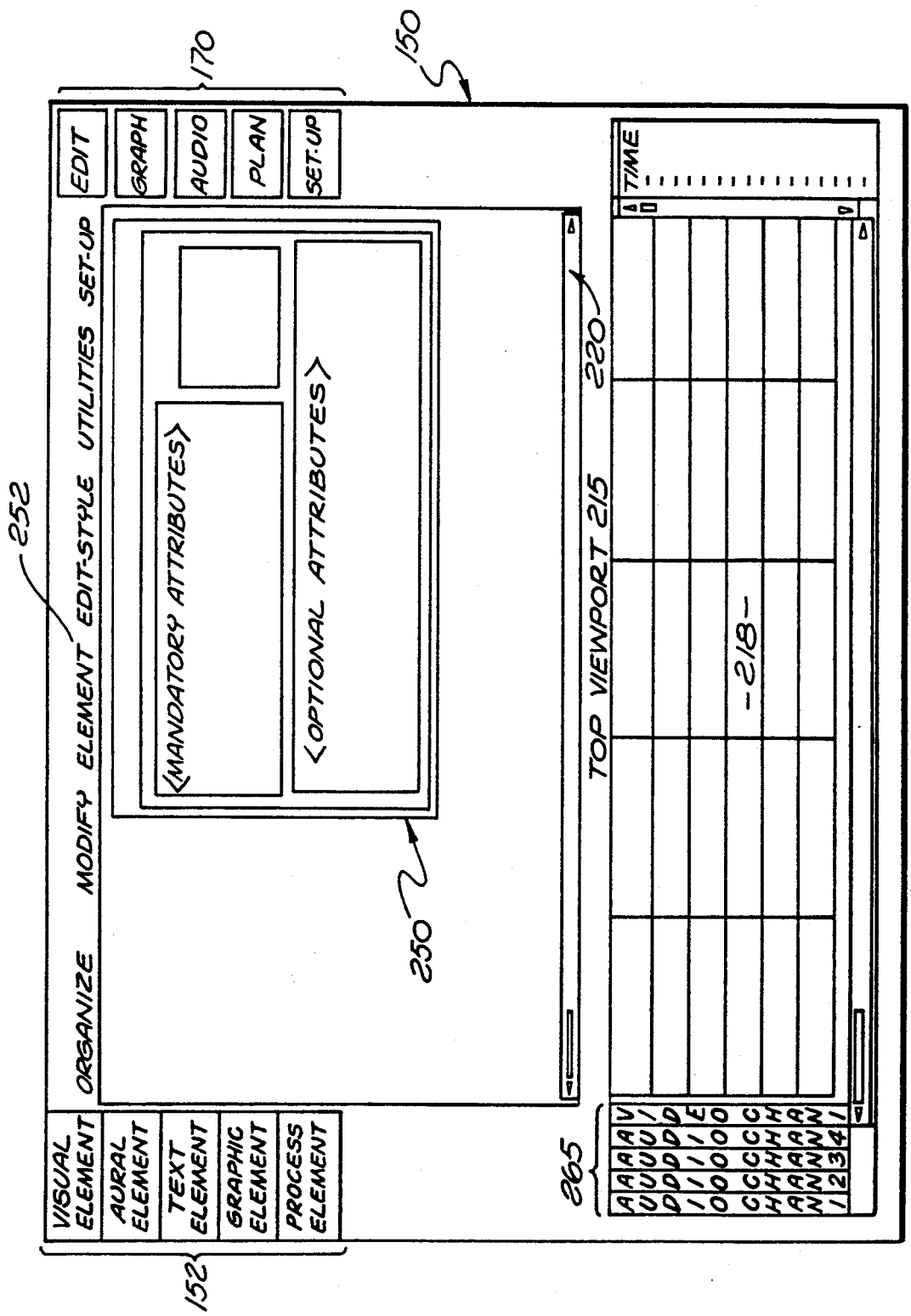
FIG. 7 is the same view as FIG. 6 except with the elment attributes window opened for venue selection.

Referring now to FIG. 7, assume for sake of example that a user desires to define an element using the present invention's user interface. An element attribute box 250 is displayed by computer 20 depicted in FIG. 2 once a selection identified as "element" 252 is chosen by a user. Although in the presently preferred embodiment, element 252 comprises a pull down menu (not shown) having a plurality of items for selection, conceptually the element 252 is selected by a user through the use of a cursor control device (see for example, U.S. Pat. No. RE32633). Although a cursor control device, such as a "mouse" may be used to select element 252, it will be appreciated that the actual selection may be made using a variety of display input devices known in the art. It will also be appreciated by one skilled in the art, that other mechanisms for selecting element 252 and the like are known. Accordingly, the particular mechanism for selecting functions, items, icons and the like within control frame 150 will not be described in detail in this Specification.

Once element 252 is selected, computer 20 illustrated in FIG. 2 displays the element attribute box 250 as shown in FIG. 7. A user then either selects from a preprinted list of elements, or defines elements within the element attribute box 250, the nature of the resource required for the particular production. Examples of such element attributes which a user may select include, but are not limited to the following:

VISUAL ELEMENT ATTRIBUTES

Label
User supplied Element identification. (e.g.: Video Tape Recorder, etc.)

Source Device
Assignment of device: (e.g.: P1, P2, RECORD, etc.)

Identification
Alpha-Numeric material Identification: e.g.: reel number, reel label, etc. lab roll number, etc.

Scene/Take Information
Content Scene and Take identification.
Scene Take file name

Codes
Time Code and type. Origin Time Code and type. User bit Time Code. User bits. Content. Frame Numbers. Edge Numbers. Code Numbers.

Notes
Associated Text Notes For Reel &/or Content.

Priority
User assigned Priority levels for different versions.

Processing Path
Information on any previous Processing that applies to this material. (e.g.: DUB LEVEL, COLOR CORRECTION, ETC.)

AUDIO ELEMENT ATTRIBUTES

Label
User supplied Element identification.

Source Device
Type and Assignment of device. (e.g. ATR, DISC, ETC.) P1, P2, RECORD, ETC.

Identification
Alpha-Numeric material identification. (e.g. Reel number, Reel label etc. Sound Roll Number, Label.)

Scene/Take #
Content Scene and Take identification.

Codes
Time Code and type. Origin Time Code and type. User bit Time Code contents. Frame Numbers.

Tracks
Number and Numbers of Source Track

Notes
Associated Text Notes. For Reel &/or Content.

Priority
User assigned Priority levels for different versions.

Processing Path
Information on any previous Processing that applies to this material. (e.g. Dub level, Equalization, etc.)

TEXT ELEMENT ATTRIBUTES

Label
User supplied Element identification.

Name
Title of Text type and Document. (SCRIPT, OPENING TITLE, CHARACTER GENERATOR, ETC)

Revision
The current Text revision level relevant previous revision information.

File Types
The Names and Types of files as the material exists in useable form.

Associated Data
Any previous data files associated with creating the current file.

Processing Path
Information on any previous Processing that applied to this material.

GRAPHIC ELEMENT ATTRIBUTES

Label
User supplied Element identification.

Title
A user supplied description of the Graphic element.

Revision
The current Graphic revision level and relevant previous revision information.

File Types
The Names and Types of files as the material exists in useable form now.

Associated Data
Any previous data files associated with creating the current file.

Processing Path
Information on any previous Processing that applies to this material.

PROCESSING ELEMENT ATTRIBUTES

Label
User supplied Element identification.

Device Identification
Effects Device identification.

Assignment Path
Video and/or Audio routing assignments. (e.g. CROSSPOINTS, KEY CHANNELS, ETC.)

Up Load/Down Load
File input/output for created effects save and recall.

Codes
Time Line Code and type. Effects durations. Effects Source codes. Effects Edge Numbers for optical printer outputs.

Processing

Effects types. (e.g. CUTS, FADES, DISSOLVES, WIPES, KEYS, DME, ETC.)

Once the element attributes have been defined, computer 20 illustrate in FIG. 2 utilizes appropriate network connections over network 44 to the various resources, such as the VTR 52, music synthesizer 55, Audio tape recorder 60, Production switcher 62, etc. to access the resource via the user interface. Accordingly, a direct connection via computer 20 has been created between the user interface comprising the control frame 150 as displayed on the display 50, and the particular element-/resource coupled through the network interface 42. Refering to FIG. 7, within the top view port 215, time elements corresponding to the particular resource have additional information that is revealed in the time line associated with the top view port 215. Tracking buses 265 provide additional information regarding the recording of audio channels 1 through 4, and a video channel 1. In practice, a source tape machine (not shown) supplies audio to a tape record machine wherein the channels are coupled to one another. It has been found that it is quite useful to display audio channels in the time view port 215, in order to correlate the audio channel and time interval versus resource.

Figure 8:
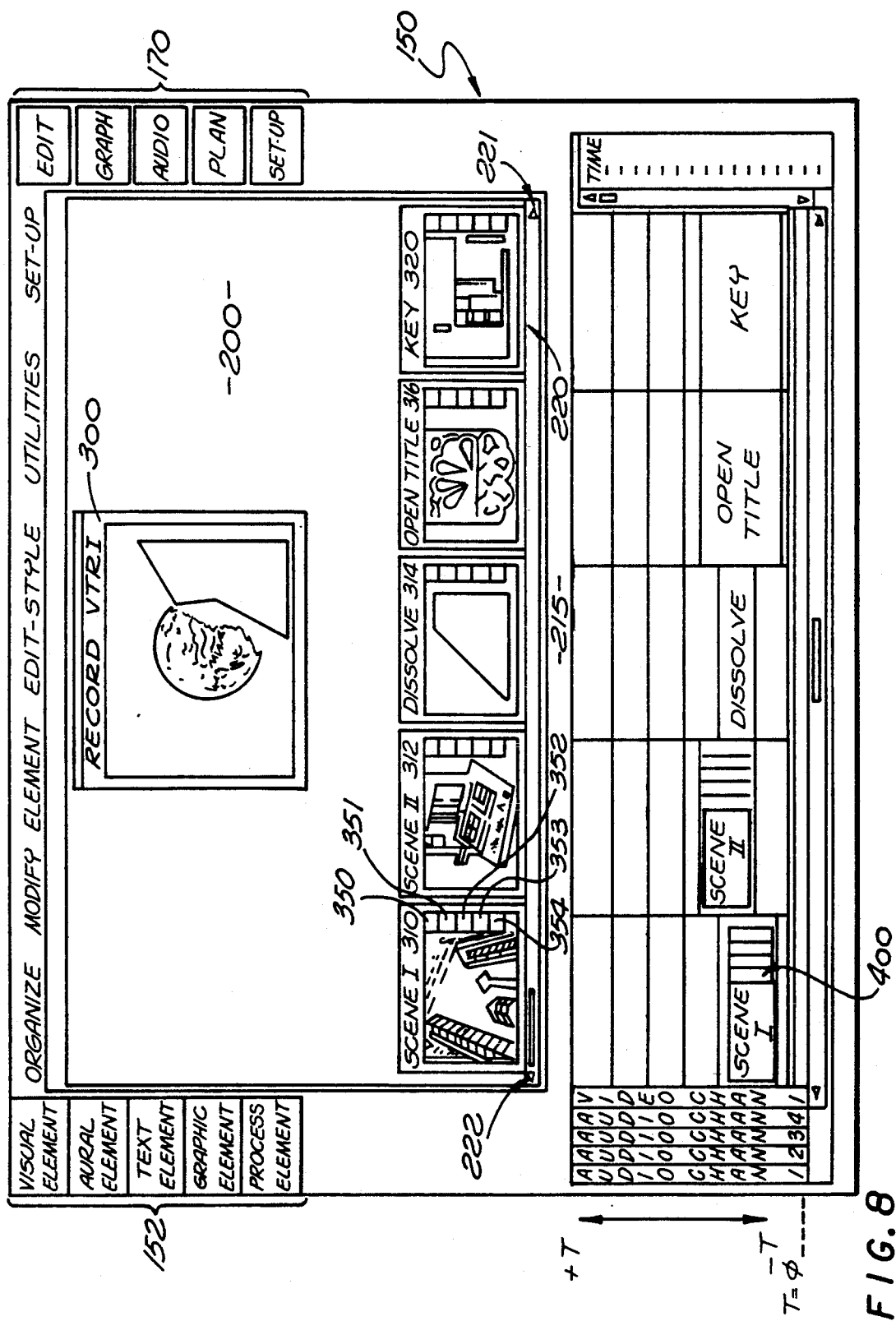
FIG. 8 is the same view as FIG. 7 further illustrating the present invention's user interface in the display in a plurality of elements and venues selected for the production of a multi-media work.

Once the element attributes have been defined, an element representing a resource is created based upon those attributes, and displayed within construction area 200 of the control frame 150. Referring now to FIG. 8, the present invention's user interface is illustrated wherein a plurality of elements identified as Record VTRI 300, Scene I 310, scene II 312, Dissolve 314, Open Title 316, and Key 320 are shown. As illustrated in FIG. 8, an element such as Record VTRI 300 includes an icon image (for example, the planet Earth in FIG. 8) which describes some aspect of the element for identification purposes. Viewing elements disposed in construction area 200 normally corresponds to viewing a venue and associated resources through a front view port as shown previously with respect to FIG. 4. An element, for example, Record VTR 300, may be moved within the construction region 200 at will by a user through the use of an appropriate command sequence, or by simply dragging the element around the construction area using a cursor control device such as a mouse. However, using the teachings of the present invention, once an element such as Scene I 310 is brought, dragged, or otherwise manipulated downward to the event horizon 220, the element is automatically given time significance which is represented along the time lines of the top view port 215.

As illustrated in FIG. 8, the event horizon 220 comprises a horizontal bar with arrows 221 and 222 at each of its opposite ends. By placing a cursor (not shown) over arrows 221 or 220, and presenting computer 20 with an activation signal, resource elements such as scene I 310, scene II 312, Dissolve 314, etc. may be moved left or right, respectively, and other elements may be viewed which are currently not visible on the event horizon in the control frame 150. The use of arrows 221 and 222 permits a user to scan through elements disposed on the event horizon 220 and view the elements not only in relative position, but in relative time. This view corresponds to that of a user 100 in FIG. 3 scanning the resources in that Figure, such as special effects 90, editing 92, video 95, etc. In addition, it will be appreciated that the relative position of the element may be changed by simply "dragging" an element such as scene I 310 off of the event horizon 220, moving other elements into that time slot along the event horizon, and replacing scene I 310 at some other location along the event horizon. A redistribution of the element's relative position along the event horizon would correspond in FIG. 4 to, for example, swapping element 110 for element 116 and vice versa.

Once an element is placed upon the event horizon 220, position data relative in time to other elements is illustrated along the time lines of the top view port 215 as shown. Conceptually, the reader is directed to FIG. 4 which illustrates in three dimensions the placement of elements relative to one another in time. However, due to the limitations of display 50, depicted in FIG. 2 the time view port 215 is utilized to display time along the $\pm Y$ direction, with time $T_o$ being at the lower portion of the display as illustrated in FIG. 8. In addition, as shown in FIG. 8, the number of versions of, for example, scene I 310, is also displayed as versions 351 through 354. It will be appreciated by the reader that the display of an element such as scene I 310 corresponds to the prior description of a resource having multiple versions which may be activated by selecting (for example, by placing a cursor over version 354 and providing an activation signal) a version such that the version is "run" within the window of scene I 310. Accordingly, user may view the entire version of scene I which has been selected, within the icon window comprising the scene. In general, in the present and preferred embodiment, and throughout this specification, placing a cursor over an icon or other executable function and "double clicking" using a cursor control device such that two consecutive signals are provided to the computer 20 depicted in FIG. 2 executes the function which has been selected, and, more particularly, reveals any attributes and/or contents of the icon. Double clicking on a time function such as time block 400 for scene I (FIG. 8) may be configured such that time code (i.e. SMPTE) is displayed. More particularly, in the present example, SMPTE time code for the beginning and end of each version within scene I 310 may be displayed within the time line view port 215.

Figure 9:
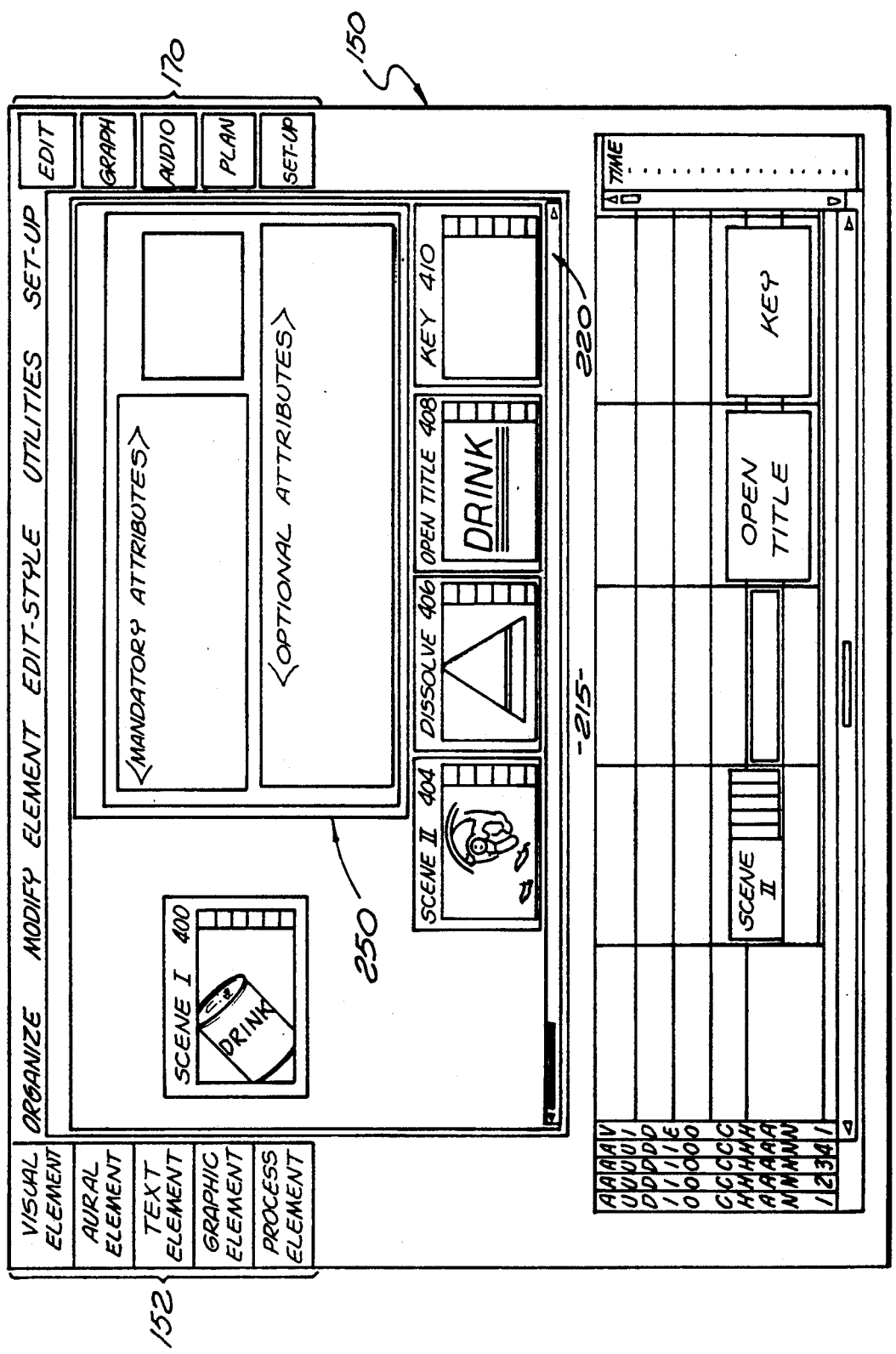
FIG. 9 is the same view as FIG. 8 further illustrating the element attribute block opened and venue and resource selection.

Referring now to FIG. 9, control frame 150 is illustrated in which a new scene I 400 has been "dragged" upward into the construction area 200. As illustrated in FIG. 9, once an element, in the present example scene I 400, is moved off of the event horizon 220, timing information viewed through top view port 215 corresponding to scene I 400 is no longer displayed. Elements such as scene II 404, dissolve 406, open title 408 or key 410 may be repositioned along the event horizon 220 and/or modified in terms of time sequence as viewed through top view port 215, relative to one another. Alternatively, and as shown in FIG. 9, element attribute box 250 may be selected and the attributes of scene I 400 may be modified, or an entirely new element may be defined, to replace scene I 400 along the event horizon 220.

It will be appreciated that a user utilizing the interface comprising the present invention defines elements in the construction area 200 by specifying attributes of the element in the element box 250. In addition, multiple elements may be created within the construction area 200. The created elements may then be selectively dragged to the event horizon 220 in an arrangement and order selected by the user. It will further be appreciated from the above discussion by one skilled in the art that the present invention's user interface permits the utilization of resources within the system illustrated in FIG. 2, permits selective modification of the resources, and through the use of the interface of the present invention provides a consistent interface for the production of an audio visual work. The user interface of the present invention, through the use of a common control frame 150 as displayed on display 50, allows artists, musicians, and other media professionals to create, modify and rearrange resources comprising a production with flexibility heretofore unknown in the art. The present invention's concept of venues, and the ability to operate on resources in three dimensions, provides a user with flexibility not present in any prior user interface for computer display systems, as well as multi-media production systems known in the past.

The present invention has been described and illustrated with reference to the Figures as applied to a display 50, and using input devices, such as digital pad 36, trackball 40 and keyboard 38 as shown in FIG. 2. However, the teachings of the present invention may be applied to numerous other display devices and input mechanisms. For example, the present invention may be practiced using what is known as "virtual reality" input devices, such as but not limited to, a data input glove, body glove input device, etc. In addition, the present invention may be utilized with eye goggle displays which are worn by a user and coupled to the computer display system via fiber optics, wires and the like. When the present invention is utilized in conjunction with a virtual reality system, the user interface of the present invention would be viewed by a user through input goggles as being suspended in space. Interaction with the interface by the user may be done using an input glove or other virtual reality device worn by the user. Accordingly, it will be appreciated that the user interface of the present invention is not limited to conventional input or display devices. The reader is referred to the following references for a further description of existing and proposed virtual reality systems. *Computerized Reality Comes of Age*, NASA Tech Briefs, page 10, August 1990 (Vol. 14, number 8); Iwata, *Artificial Reality with Force—Feedback; Development of Desktop Virtual Space with Compact Master Manipulator*, ACM SIGGRAPH, August 1990 (Vol. 24, number 4); Nash, *Our Man in Cyberspace Checks out Virtual Reality*, Computerworld, Oct. 15, 1990; Daviss, Grand Illusions, Discover, June 1990.

While the present invention has been described in conjunction with a few specific embodiments identified in FIGS. 1 through 9, it will be apparent to those skilled in the art that many alternatives, modifications and variations in light of the foregoing description are possible. Accordingly, the invention is intended to embrace all such alternatives, modifications and variations as may fall within the spirit and scope of the invention as disclosed.

We claim:

1. A computer controlled display system including at least one Central Processing Unit (CPU), said CPU coupled to a display for displaying data, and user input means, said display system further coupled to a plurality of system resources having defined attributes, said display system comprising:

a user interface for display by said display means, said user interface for displaying representations of resources coupled to said display system with which a user interacts through said user input means;

said representations of said resources comprising at least three dimensions and being arranged in a venue of at least three dimensions, each of said dimensions corresponding to an attribute of said resources, said venue may be viewed using said interface from a plurality of view ports, such that viewing said representations of said resources from different view ports results in the display of different attributes of said resources;

said representations of said resources being arranged in said venue such that each of said representations is disposed relative to one another in time and space within said venue;

manipulation means coupled to said user input means for selectively positioning said representations of said resources within said venue.

2. The display system as defined by claim 1 wherein said venue is three dimensions and each of said representations of said resources comprise three dimensions.

3. The display system as defined by claim 2 wherein said venue may be viewed from six view ports, namely, a top, left, right, rear, bottom and front view port.

4. The display system as defined by claim 3 wherein viewing said venue from a top view port reveals the relative positions of each of said three dimensional representations of said resources relative in time to one another.

5. The display system as defined by claim 4 wherein viewing said venue from a front view port reveals an icon identifying the type of resource each of said representations represent.

6. The display system as defined by claim 5 wherein viewing said venue from a side view port reveals versions of said resource and the lengths of said versions relative to one another.

7. The display system as defined by claim 6 wherein viewing said venue from a front view port further reveals version activation buttons, one of said buttons for each of said versions, such that said user, using said user input means may selectively activate said versions.

8. The display system as defined by claim 7 wherein in the event said user activates one of said versions, said version is executed within said representation of said resource, and may viewed through said front view port of said venue on said display.

9. The display system as defined by claim 6 wherein said user interface includes interface generation means coupled to said CPU for generating and displaying a control frame using said display means to display selected view ports of a venue, said control frame including a plurality of command options which may be selected by said user using said user input means.

10. The display system as defined by claim 9 wherein said control frame further includes a first area for defining said attributes of said resources and displaying said representations of said resources once said attributes are defined.

11. The display system as defined by claim 10 wherein said first area displays said representations of said resources in a venue initially from a first view port.

12. The display system as defined by claim 11 wherein said user may selectively change view ports from said first view port by selecting one of said command options.

13. The display system as defined by claim 10 wherein said control frame further includes a second area for displaying said top view port of said venue, such that timing data representing relative time associated with said resources is displayed in said second area.

14. The display system as defined by claim 13 wherein said control frame further includes a event horizon bar, such that the placement of a representation of a resource on said bar results in said timing data being displayed in said second area of said control frame.

15. The display system as defined by claim 14 wherein selecting an Element command option results in the display of an element attribute box for defining said resource attributes.

16. The display system as defined by claim 15 wherein said representations of said resources may be selectively placed on said event horizon bar, thereby altering the relative placement of said representations in said venue in time and space.

17. The display system as defined by claim 16 wherein said command options of said control frame further includes a plurality of mode specific action options on the periphery of said control frame.

18. The display system as defined by claim 17 wherein said command options of said control frame further includes a plurality of major mode options on the periphery of said control frame.

19. The display system as defined by claim 18 wherein said first view port initially displayed comprises the front view port.

20. A computer controlled display system including at least one Central Processing Unit (CPU), said CPU coupled to display means for displaying data on a screen of a display, and user input means, said display system further coupled to a plurality of system resources having defined attributes, said display system comprising:
a user interface on said screen of said display for displaying representations of resources coupled to said display system with which a user interacts through said user input means;
said user interface including interface generation means coupled to said CPU for generating and displaying a control frame on said display, said control frame including a plurality of command options which may be selected by said user using said user input means, and further including a event horizon bar, such that the placement of a representation of a resource on said bar using said user input means results in predetermined data being displayed in said control frame and said representations of said resources being disposed relative to one another in time;
said representations of said resources comprising at least three dimensions and being arranged in a venue of at least three dimensions which may be viewed using said user interface from a plurality of view ports, such that viewing said representations of said resources from different view ports results in the display on said screen of different attributes of said resources.

21. The display system as defined by claim 20 wherein said control frame further includes a first area for defining said attributes of said resources and displaying representations of said resources once said attributes are defined.

22. The display system as defined by claim 21 wherein selecting an Element command option results in the display of an element attribute box for defining said resource attributes.

23. The display system as defined by claim 22 wherein said command options of said control frame further includes a plurality of mode specific action options on the periphery of said control frame.

24. The display system as defined by claim 23 wherein said representations of said resources are arranged in said venue such that each of said resources is disposed relative to one another in time and space within said venue.

25. The display system as defined by claim 24 further including manipulation means coupled to said user input means for selectively positioning said representations of said resources within said venue.

26. The display system as defined by claim 24 wherein said venue is three dimensions and each of said representations of said resources comprise three dimensions.

27. The display system as defined by claim 26 wherein said venue may be viewed from six viewports, namely, a top, left, right, rear, bottom and front view port.

28. The display system as defined by claim 27 wherein viewing said venue from a top view port reveals the relative positions of each of said three dimensional representations of said resources relative in time to one another.

29. The display system as defined by claim 28 wherein viewing said venue from a front view port reveals an icon identifying the type of resource each of said representations represent.

30. The display system as defined by claim 29 wherein viewing said venue from a side view port reveals versions of said resource and the lengths of said versions relative to one another.

31. The display system as defined by claim 30 wherein viewing said venue from a front view port further reveals version activation buttons, one of said buttons for each of said versions, such that said user, using said user input means may selectively activate said versions.

32. The display system as defined by claim 31 wherein in the event said user activates one of said versions, said version is executed within said representation of said resource, and may viewed through said front view port of said venue on said display.

33. The display system as defined by claim 32 wherein said first area displays said representations of said resources in a venue initially from a first view port.

34. The display system as defined by claim 33 wherein said user may selectively change view ports from said first view port by selecting one of said command options.

35. The display system as defined by claim 34 wherein said control frame further includes a second area for displaying said top view port of said venue, such that timing data representing relative time associated with said resources is displayed in said second area.

36. The display system as defined by claim 35 said representations of said resources may be selectively placed on said event horizon, thereby altering the relative placement of said representations in said venue in time and space.

37. The display system as defined by claim 36 wherein said command options of said control frame further includes a plurality of major mode options on the periphery of said control frame.

38. The display system as defined by claim 37 wherein said first view port initially displayed comprises the front view port.

39. In a computer controlled display system including at least one Central Processing Unit (CPU), said CPU coupled to a display for displaying data on a screen of said display, and user input means, said display system further coupled to a plurality of system resources having defined attributes, a method for manipulating and displaying representations of said resources on said display, comprising the steps of:

providing a user interface on said screen of said display for displaying representations of resources coupled to said display system with which a user interacts through said user input means;

generating and displaying a control frame on said display using interface generation means coupled to said CPU, said control frame including a plurality of command options which may be selected by said user using said user input means, and further including a event horizon bar, such that the placement of a representation of a resource on said bar using said user input means results in predetermined data being displayed in said control frame, and said representations of said resources being disposed relative to one another in time;

said representations of said resources comprising at least three dimensions and being arranged in a venue comprising at least three dimensions which may be viewed using said user interface from a plurality of view ports, such that viewing said representations of said resources from different view ports results in the display on said screen of different attributes of said resources.

40. The method as defined by claim 39 wherein said control frame further includes a first area for defining said attributes of said resources and displaying representations of said resources once said attributes are defined.

41. The method as defined by claim 40 further including the step of selecting an Element command option and displaying an element attribute box for defining said resource attributes.

42. The method as defined by claim 41 wherein said command options of said control frame further includes a plurality of mode specific action options on the periphery of said control frame.

43. The method as defined by claim 42 wherein said representations of said resources are arranged in said venue such that each of said resources is disposed relative to one another in time and space within said venue.

44. The method as defined by claim 43 wherein said venue is three dimensions and each of said representations of said resources comprise three dimensions.

45. The method as defined by claim 44 further including the step of selectively viewing said venue from one of six viewports, namely, a top, left, right, rear, bottom and front view port.

46. The method as defined by claim 45 wherein viewing said venue from a top view port reveals the relative positions of each of said three dimensional representations of said resources relative in time to one another.

47. The method as defined by claim 46 wherein viewing said venue from a front view port reveals an icon identifying the type of resource each of said representations represent.

48. The method as defined by claim 47 wherein viewing said venue from a side view port reveals versions of said resource and the lengths of said versions relative to one another.

49. The method as defined by claim 48 wherein viewing said venue from a front view port further reveals version activation buttons, one of said buttons for each of said versions, such that said user, using said user input means may selectively activate said versions.

50. The method as defined by claim 49 further including the step of said user activating one of said versions, said version then being executed within said representation of said resource, viewed through said front view port of said venue on said display.

51. The method as defined by claim 50 wherein said first area displays said representations of said resources in a venue initially from a first view port.

52. The method as defined by claim 51 further including the step of said user selectively changing view ports from said first view port by selecting one of said command options.

53. The method as defined by claim 52 wherein said control frame further includes a second area for displaying said top view port of said venue, such that timing data representing relative time associated with said resources is displayed in said second area.

54. The method as defined by claim 53 further including the step of selectively placing said representations of said resources on said event horizon, thereby altering the relative placement of said representations in said venue in time and space.

55. The method as defined by claim 54 wherein said command options of said control frame further includes a plurality of major mode options on the periphery of said control frame.

56. The method as defined by claim 55 wherein said first view port initially displayed comprises the front view port.

* * * * *